Dec. 13, 1932. J. R. GAMMETER 1,891,088
MOLD FILLING MACHINE
Filed July 26, 1928 7 Sheets-Sheet 1

Inventor
John R. Gammeter
By Robert M. Pierson
Atty

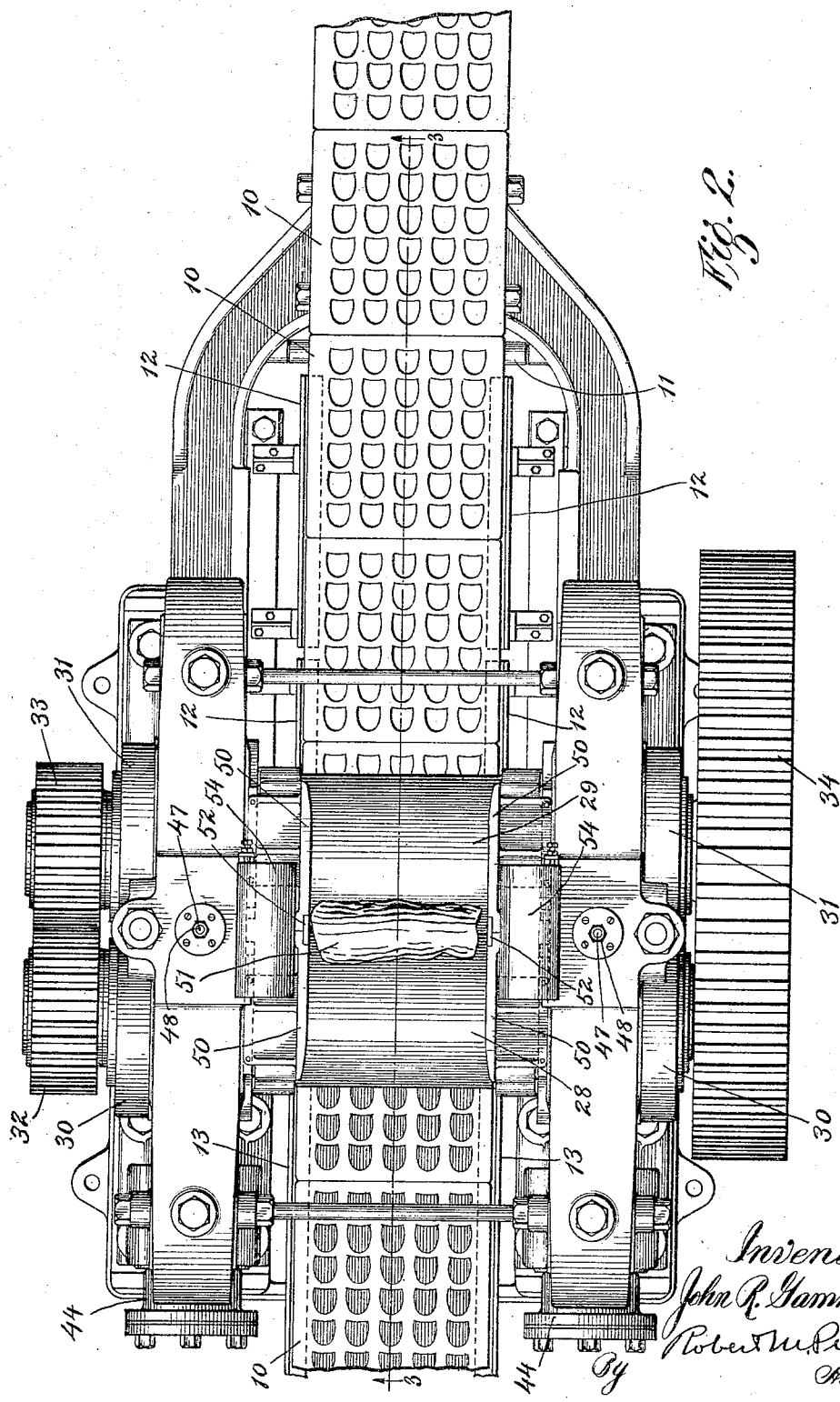

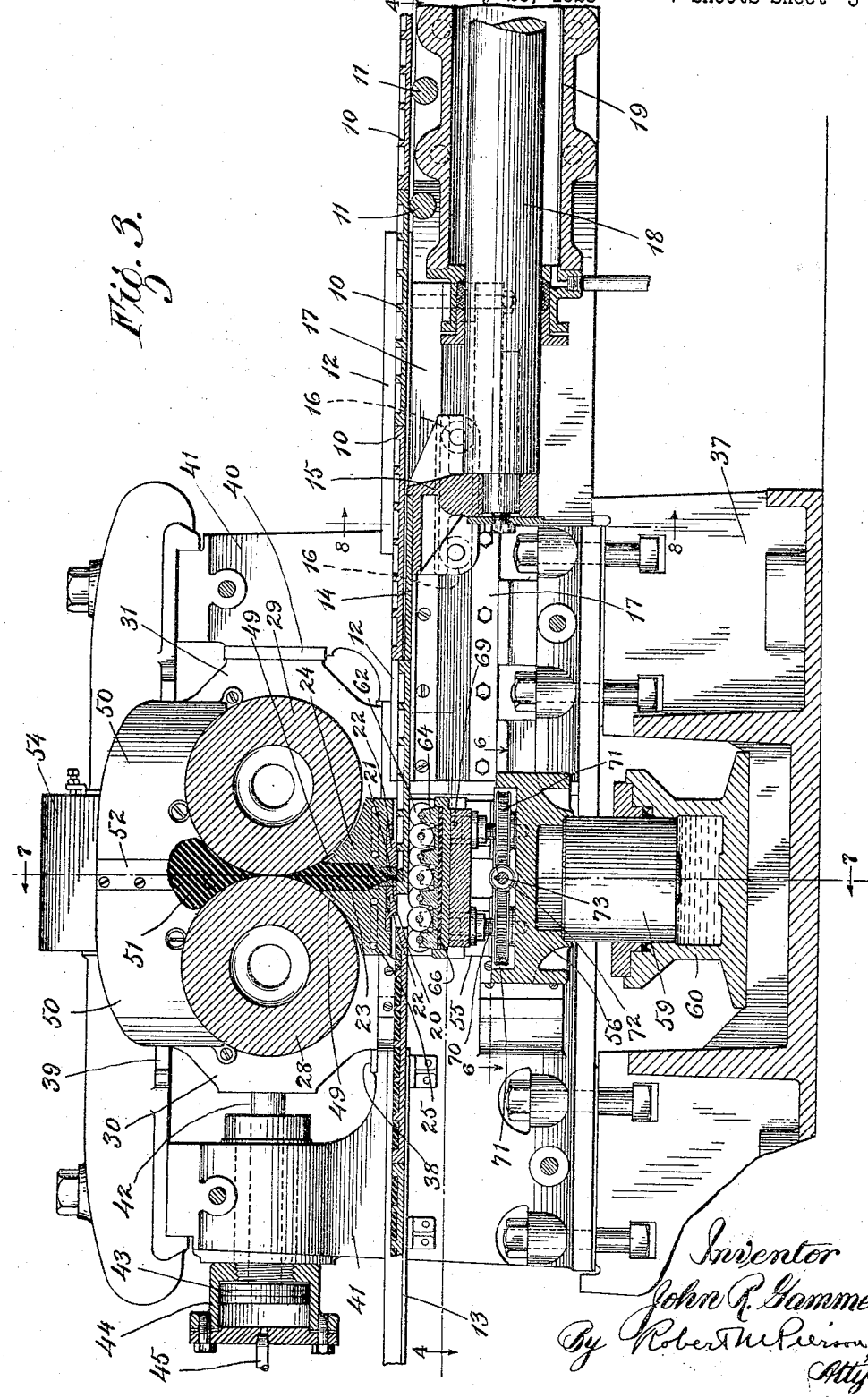

Dec. 13, 1932.                J. R. GAMMETER                1,891,088
                            MOLD FILLING MACHINE
                   Filed July 26, 1928        7 Sheets-Sheet 4

Fig. 3

Inventor
John R. Gammeter
By Robert W. Pierson
Atty.

Dec. 13, 1932.   J. R. GAMMETER   1,891,088
MOLD FILLING MACHINE
Filed July 26, 1928   7 Sheets-Sheet 5

Inventor
John R. Gammeter
By Robert M. Pierson
Atty

Dec. 13, 1932.      J. R. GAMMETER      1,891,088
MOLD FILLING MACHINE
Filed July 26, 1928      7 Sheets-Sheet 7

Inventor
John R. Gammeter
By Robert M. Pierson
Atty.

Patented Dec. 13, 1932

1,891,088

UNITED STATES PATENT OFFICE

JOHN R. GAMMETER, OF AKRON, OHIO

MOLD FILLING MACHINE

Application filed July 26, 1928. Serial No. 295,371.

This invention relates to machines for filling molds, particularly multi-cavity molds for vulcanizing small articles of simple form such as rubber heels.

Among the principal objects of my invention are to provide a continuous-feed machine which shall be capable of furnishing a substantially uniform filling pressure across the entire width of the mold, to avoid the trapping of air in the stock, to bring about an instant cessation or resumption of the material feed when required, to feed the molds past the filling position in a simple and positive manner, to support them effectively while being filled, and to provide means for readily opening the machine to give access for cleaning.

Of the accompanying drawings:

Fig. 2 is a plan view thereof.

Fig. 3 is a vertical longitudinal section on the line 3—3 of Fig. 2.

Fig. 4 is a horizontal section on the line 4—4 of Fig. 3.

Figure 1:
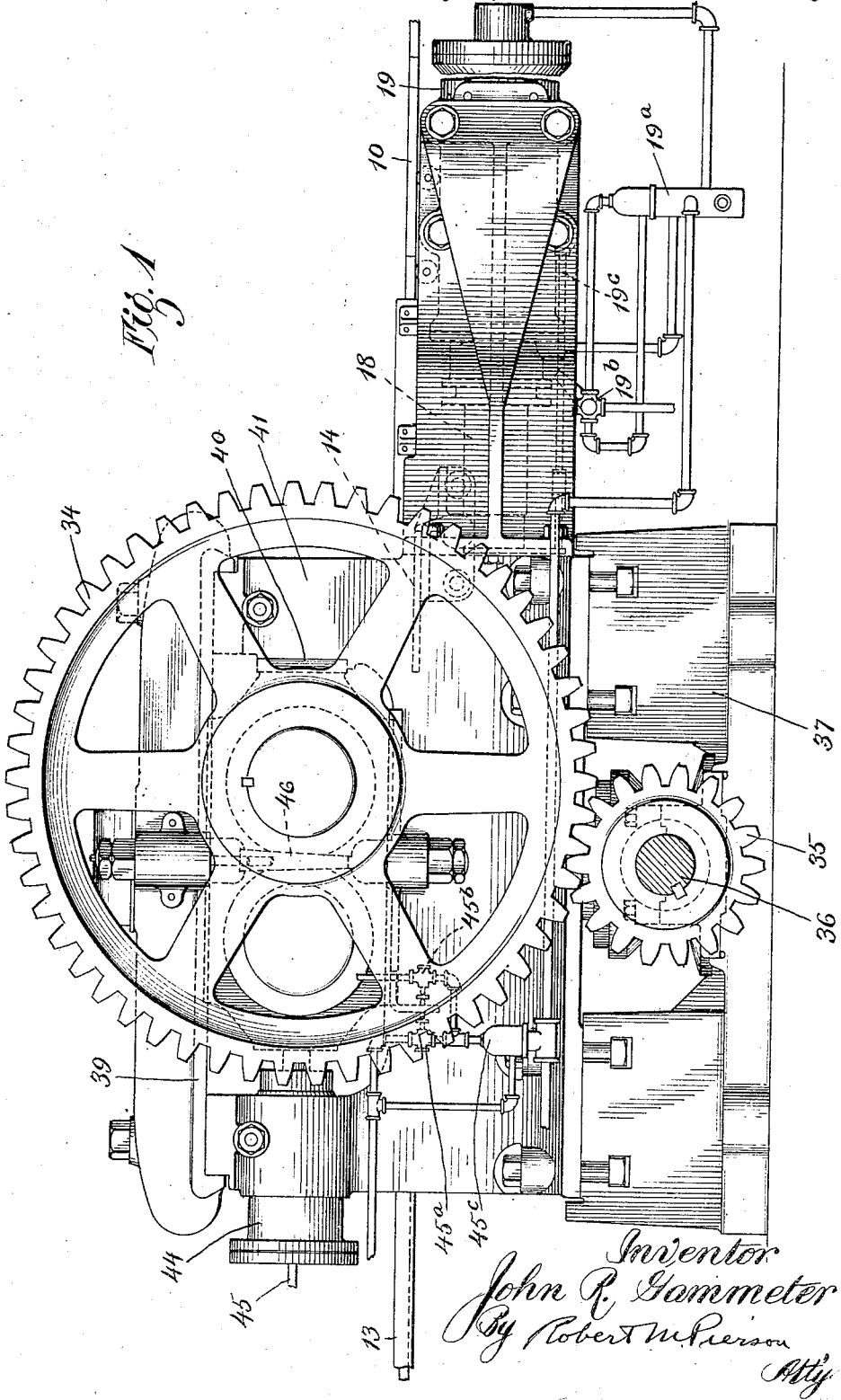
Fig. 1 is a side elevation showing a preferred embodiment of my new mold-filling machine.

In the drawings, 10, 10 are the multi-cavity heel molds which are introduced from a gravity chute (not shown) over rollers 11 at the right of the machine and mounted to slide in guides 12 located in advance of the mold filling position, and received in similar guides 13 at the left of the machine after being filled.

Figure 5:
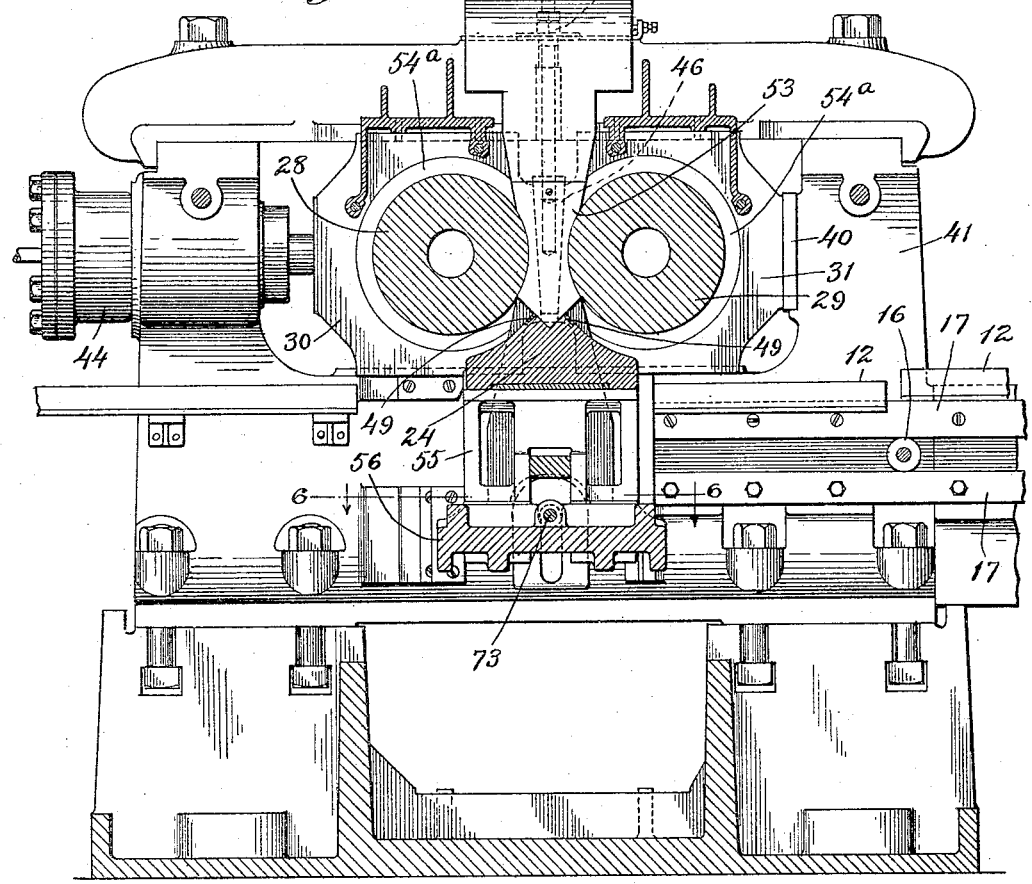
Fig. 5 is a vertical section on the line 5—5 of Fig. 7.
Figure 8:
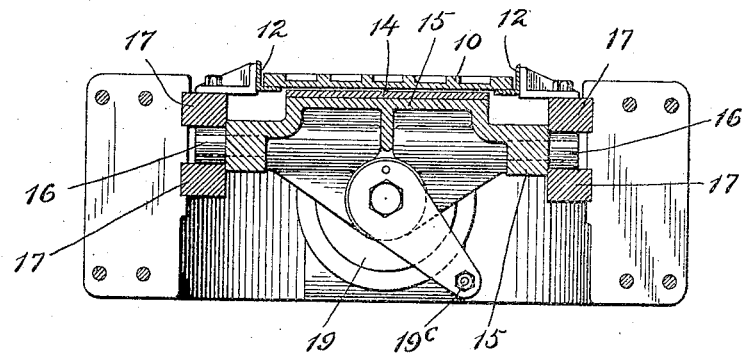
Fig. 8 is a section on the line 8—8 of Fig. 3.

The molds are successively fed past the filling position by a reciprocating pusher plate 14 supported on a head 15 which is provided with rollers 16 working in fixed guides 17, said head being attached to the forward end of a hydraulic plunger 18 which works in a cylinder 19. The plunger carries a double-acting piston (not shown) and the cylinder is provided with means consisting of a piston-valve 19a and suitable piping, a pilot valve 19b (Fig. 1) and a trip-rod 19c (Figs. 1 and 8) moving with the plunger for controlling the supply and discharge of pressure fluid from the cylinder in order automatically to project and retract said plunger and impart the necessary mold-feeding movements to the pusher plate 14. As indicated in Figs. 3 and 8 the foremost empty molds in the series at the right of the machine are carried in the first pair of guides 12 in a position immediately above the path of pusher plate 14, the second pair of guides 12 being placed at a lower level (Figs. 3 and 5) so that a mold resting thereon will be in the path of the pusher plate. As the series is advanced by suitable pressure furnished from behind, the first empty mold comes to a stop against the right-hand vertical face of the gum-pot 24 hereinafter referred to, and rides on top of the pusher plate while the latter is pushing the preceding mold through the filling position. When the pusher is retracted, this foremost empty mold then drops down onto the second pair of guides 12, in front of the pusher plate, and in turn is advanced by the latter while being charged with plastic rubber compound, and so on.

Figure 7:
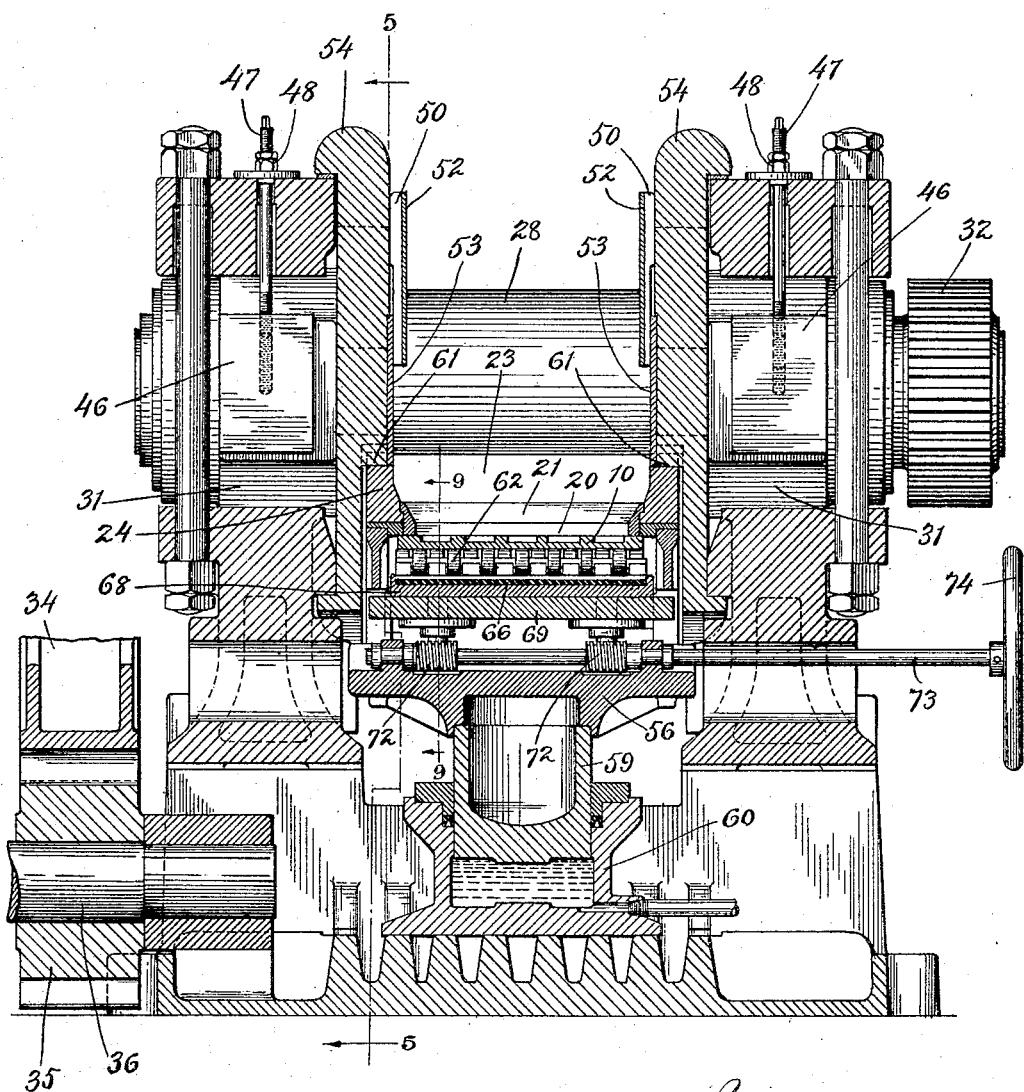
Fig. 7 is a transverse vertical section on the line 7—7 of Fig. 3.
Figure 9:
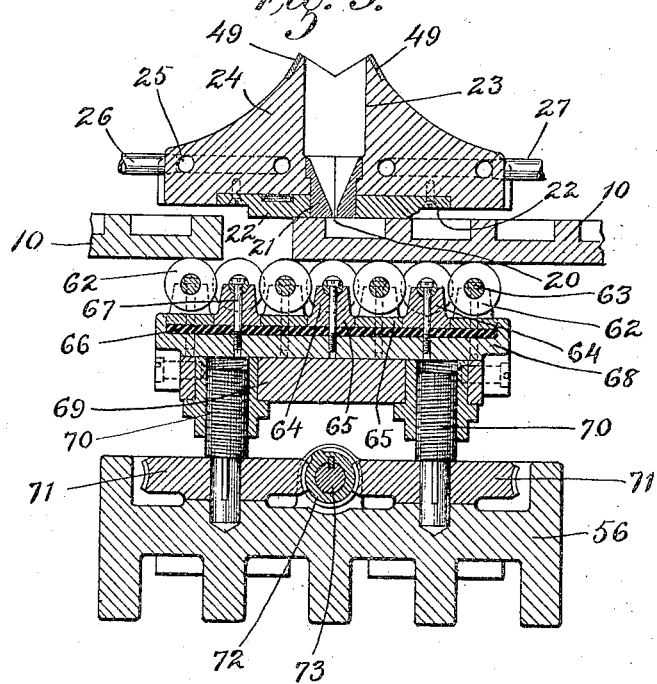
Fig. 9 is an enlarged vertical section on the line 9—9 of Fig. 7.

20 is a mold-filling slot, best shown in Figs. 3, 7, and 9, formed in a die or nozzle 21 which is mounted between mold-bearing plates 22 at the outlet of the transversely-elongated, vertical cavity or passage 23 in a gum-pot 24, said pot being provided with steam ducts 25 to which are connected supply and discharge pipes 26, 27 for furnishing heat to maintain the rubber compound in a highly plastic condition.

The rubber stock is fed to the passage 23 by a pair of horizontal smooth-faced forcing rolls 28 and 29 which work together on the principle of a rubber mill or calender. The roll journals are mounted in bearings 30, 31 and geared together at one end by spur gears 32, 33 of equal size, and the roll 29 has mounted on its trunnion at the opposite end a large gear 34 meshing with a pinion 35 on a drive-shaft 36 connected with a suitable source of power, said shaft being mounted in a bearing on the bed frame 37 of the machine.

The roll bearings 30, 31 are mounted between horizontal guides 38, 39 and the bearings 31 for the roll 29 are held in fixed position by stops 40 on the main body frame 41 of the machine. The bearings 30 for the roll 28, however, are adapted to slide leftwardly to permit the movement of said roll from its position of nearest approach to the roll 29, shown in Fig. 3, not only for the purpose of adjusting the thickness of the stock in the nip of the rolls when in their operative relation, but also to retract the roll 28 more widely from roll 29 in order to stop or diminish the feeding of the plastic stock through the passage 23 and discharge slot 20, the gears 32, remaining in mesh during this separation of the rolls.

Roll 28 is projected or held up to its stock-feeding position with relation to roll 29 by a pair of plunger rods 42 guided horizontally in the body frame and attached to respective short-stroke pistons 43 which work in hydraulic cylinders 44. These cylinders are provided with supply pipes 45 connected with an accumulator which maintains a substantially constant pressure of water on the pistons, the area of which, multiplied by the pressure, is so calculated as to give the effect of a spring of predetermined force.

The rolls are thus yieldingly held together by the hydraulic pressure in the cylinders 44 and when the pressure of gum in pot 24 becomes excessive, its reaction forces the roll 28 to yield against the hydraulic pressure and stop or diminish the feeding action of the rolls. Pilot valves 45a and 45b, controlled by the position of the roll 28, and a piston valve 45c controlling the action of valve 19a are shown in Fig. 1 for regulating the mold-feeding speed of pusher-plate 14, but this valve-mechanism is not claimed in the present application.

The width of the working space between the rolls 28, 29 may be regulated by means of a pair of vertical wedges 46 (Figs. 1, 5, and 7) located between the respective pairs of roll bearings and adjusted by means of screws 47 and nuts 48. The upper edges of the gum-pot 24 are reinforced with hardened plates 49 which act as scrapers against the rolls 28, 29 on their discharge side, to direct the plastic rubber into the feed passage 23.

50, 50 are guide plows or deflectors each made in two sections attached to the respective roll bearings 30, 31 at each end of the space on the upper or receiving side of said rolls for determining the length of the bank 51 of rubber stock fed between the rolls, one of these guide sections at each end having a bridge-plate 52 which overlaps the other section to preserve the continuity of the two sections when the rolls are separated. The machine is further provided at the ends of the gum space with thin shields 53 (Figs. 5 and 7) mounted on frame members 54 and having edges let into circumferential grooves 54a in the rolls for properly guiding the stock on the discharge side into said passage 23.

Figure 6:
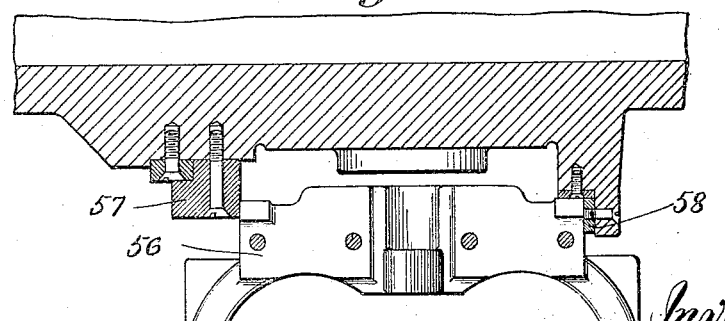
Fig. 6 is a horizontal section on the line 6—6 of Fig. 5.

The gum pot 24 is carried at the upper end of a vertically-movable frame or slide 55, 56 mounted between suitable guides 57, 58 one pair which is shown in Fig. 6, the lower member 56 of said slide being a head mounted on a hydraulic ram or plunger 59. Said ram works in a cylinder 60 in which water pressure from an accumulator is constantly maintained during normal operation, to hold said slide in its highest position, the upper limit of movement being determined by the abutting of the V-shaped end walls of the gum pot 24 against complementally-formed stop shoulders 61 on the frame members 54 (Fig. 7).

To form an anti-friction support for the molds 10 in their passage under the filling slot 20 I provide a number of short rollers 62 arranged in parallel rows, said rollers being staggered and slightly overlapped in adjacent rows and mounted to turn on shafts 63 each of which is supported on a series of pillow blocks 64 and each row of blocks formed on a common bar 65. The several pillow-block bars are bedded upon a thick sheet or slab of soft rubber 66 which permits the rollers to yield slightly to the downward pressure of the molds. The upward movement of the pillow-block bars is limited by the heads of a series of screws 67 mounted in a table 68 under the rubber slab 66 and passing loosely upward through the bars and through the roller shafts 63 supported thereby.

For adjusting the height of the series of rollers 62, to leave the proper space for the reception of the molds between them and the feed nozzle and bearing plates 22, I mount the table 68 upon a plate 69 supported by four leveling screws 70 to each of which is attached a worm wheel 71 whose hub has a thrust bearing on the slide member 56. The screws 70 are arranged in pairs having right and left threads and the worm wheels 71 mesh with respective worms 72 on an adjusting shaft 73 journaled upon the member 56 and carrying a hand wheel 74 (Figs. 4 and 7) at its outer end, whereby all four leveling screws may be simultaneously and equally adjusted to raise and lower the group of rollers 62.

I thus provide hydraulically-operated means for holding the gum-pot 24 elevated in its working position adjacent to the forcing rolls 28, 29 and lowering it therefrom when it is desired to clean out the gum-pot passages and surfaces, while on the slide 55, 56 I provide a means of accurately adjusting the group of rollers 62 to provide the proper space for passing the molds through the feeding position.

In the operation of this machine the empty heel molds 20 are introduced in series at the right of the machine under pressure furnished by any suitable means such as gravity chute and as each foremost mold drops down onto the lower pair of guides 12 in front of the pusher plate 14 when the latter reaches the limit of its back stroke, said mold is then advanced by said pusher plate through the filling position by means of the hydraulic pressure in cylinder 19 acting on the piston of plunger 18.

Pieces of vulcanizable raw rubber compound are fed by hand or otherwise into the receiving space between the rolls 28, 29 on the upper side thereof to form a bank 51 which is squeezed into the very narrow space about one-sixteenth of an inch wide, between the rolls, the gum being carried downwardly under heavy feeding pressure into and through the cavity or passage 23 in the gum-pot 24. The gum is kept soft while in said gum-pot by the heat of the steam circulated through the ducts 25 therein, and is extruded through the slot 20 in the die 21 at the lower end to fill the cavities in the heel molds 10 as they are passed underneath said slot, each mold during its passage being tightly held against the wear plates 22 by the anti-friction rollers 62, but with a slightly yielding pressure transmitted through the rubber slab 66 to avoid jamming and scratching of the molds.

As each mold is filled, its advancing end is carried into the receiving guide 13, and the next succeeding mold which passes through the filling position pushes it further onto said guide, and so on in series. The filled molds can be removed by hand or otherwise from the receiving guides and will then have their top plates applied, whereupon they are ready to be placed in a vulcanizer.

During each retracting movement of the mold pusher-plate 14 it is desirable to suspend the gum feed through the filling slot 20. This may be done, either by hand or automatically, in timed relation to the movements of said pusher plate, by opening suitable relief-valve mechanism (not shown) connected with the pipes 45 to release the pressure in the hydraulic cylinders 44 and permit the pressure of the gum to force roll 28 away from roll 29 and from the left-hand scraper, whereupon the stock will follow around on roll 28 instead of being forced into the passage 23 in the gum pot. On restoring the hydraulic pressure in the cylinders 44 and forcing the roll 28 back to its feeding position with reference to its mating roll and the scraper, there is an instant resumption of the stock feed while the next-succeeding mold is being pushed through the filling position.

Should the pressure of gum in the pot 24 become excessive, as when the lands or solid parts of the mold are passing underneath the slot 20 or because of accidental clogging of said slot, the reaction of this excessive gum pressure will automatically produce a corresponding recession of roll 28 against the hydraulic pressure in the cylinder 44 and the accumulator which supplies them, and the material feed will be diminished in proportion or completely suspended.

The rolls 28, 29 serve to force the rubber through the filling slot 20 with a uniform and ample pressure throughout the length of said slot, and since substantially all air is forced out of the bank 51 undergoing mastication on the upper side of the rolls there is no trapping of air in the stock which enters the molds. The feeding action is continuous as long as the rolls are together and stock is supplied to their upper side. My invention in those and other respects above indicated possesses marked advantages over mold-filling devices heretofore proposed.

It will be understood that the described form could be varied in many particulars without departing from the scope of my invention as defined in the claims.

I claim:

1. In a machine for extruding plastic material, the combination of a pair of forcing rolls, means forming a receiving passage on the delivery side of said rolls, a die opening leading directly from said passage and scraping means working against the rolls for directing the stock into said passage, one of said rolls being movable away from the other and away from said scraping means.

2. In a machine for extruding plastic material, the combination of a pair of forcing rolls, means normally contacting with the rolls for removing the stock from said rolls on the delivery side thereof and feeding it directly to a die opening, and means for causing separation of the rolls and for moving one of the rolls from said contacting means to suspend their feeding action.

3. In a machine for extruding plastic material, the combination of a pair of forcing rolls, a receiving structure in the delivery space between the rolls, formed with a die opening leading directly therefrom and having scrapers normally contacting with the peripheries of the rolls at the inlet end of said passage, and means for causing a retraction of one of said rolls from the other and from the adjacent scraper to suspend the feed.

4. In a machine for extruding plastic material, the combination of a pair of forcing rolls geared together to rotate in opposite directions, means normally contacting with the rolls for directing the material away from said rolls on their delivery side and feeding it directly to a die opening, and means for withdrawing one of said rolls from the other and from said contacting means far enough to suspend the feed and cause the material to follow around said withdrawn roll without unmeshing their connecting gears.

5. In a machine for extruding plastic material, the combination of a pair of forcing rolls mounted in bearings one set of which is movable to permit the corresponding roll to be withdrawn from the other roll, adjustable stops between the bearings for limiting the approach of the rolls, fluid-pressure cylinders and pistons for holding the movable bearings against said stops, and means for automatically charging and discharging said cylinders to control the feed between the rolls.

6. In a mold filling machine, the combination of a pair of continuously-acting pressure rolls for feeding plastic material between them, a receiving structure engaging the peripheries of said rolls and formed with a passage on the delivery side of said rolls, said passage terminating directly in a discharge opening through which the plastic material is fed under pressure, and means for guiding a mold past said opening in filling relation thereto.

7. In a mold filling machine, the combination of a pair of forcing rolls, a gum-pot located on the delivery side of said rolls and formed with a passage terminating in a discharge slot, means for guiding a mold in filling relation to said slot, and means permitting the retraction of said gum-pot from the rolls in a direction transverse to their axes for the purpose of cleaning it.

8. In a mold filling machine, the combination of a pair of forcing rolls, a gum-pot on the delivery side of said rolls formed with a passage terminating in a discharge slot, means for guiding a mold past said slot in filling relation thereto, a fluid-pressure cylinder and piston for holding said gum-pot in operative relation to said rolls, and means for charging and discharging said cylinder.

9. In a mold filling machine, the combination of mold filling means including a gum-pot provided with a discharge slot and mounted on a sliding carriage which permits withdrawal of said gum-pot for cleaning purposes, and means on said carriage for guiding the molds through the filling position.

10. In a mold filling machine, the combination of mold filling means including a pair of forcing rolls, intermittently-acting means for feeding the molds through the filling position, and means permitting the withdrawal of one of said forcing rolls from the other to suspend the material feed during the periods of inaction of the mold-feeding means.

11. In a mold-filling machine, the combination of a pair of forcing rolls one of which is yieldingly mounted and separable from the other by excessive pressure of the plastic material delivered by said rolls, a pressure chamber leading from the space between said rolls and provided with a discharge opening leading directly therefrom, and means for feeding successive molds past the discharge opening whereby to fill the molds as they are fed.

12. In a mold filling machine, a pair of pressure rolls cooperating to force plastic vulcanizable material between them, means contacting with the rolls providing a pressure chamber for receiving the material from the rolls, said pressure chamber having leading directly therefrom an outlet opening at a mold filling position, means for guiding molds successively past said opening whereby to fill them with the plastic material as they are moved past the outlet opening, and means for yieldingly supporting said guiding means, whereby to maintain the molds in surface contact with the face of the pressure chamber member and to compensate for variations in thickness of successive molds.

13. In a mold filling machine, a pair of pressure rolls cooperating to force plastic vulcanizable material between them, means contacting with the rolls providing a pressure chamber for receiving the material from the rolls, said pressure chamber having leading directly therefrom an outlet opening at a mold filling position, means for guiding mold successively past said opening whereby to fill them with the plastic material directly from the pressure chamber, and means including a pressure cylinder for retractably supporting said guiding means.

14. In a mold filling machine, a pair of pressure rolls cooperating to force plastic vulcanizable material between them, means contacting with the rolls providing a pressure chamber for receiving the material from the rolls, said pressure chamber having leading directly therefrom an outlet opening at a mold filling position, means for intermittently feeding molds to be filled past said outlet opening whereby the molds will be filled directly from the outlet opening during the feeding movement, and yielding means for guiding the molds in their movement past the opening.

15. In a mold filling machine, a pair of pressure rolls cooperating to force plastic vulcanizable material between them, means contacting with the rolls providing a pressure chamber for receiving the material from the rolls, said pressure chamber having an outlet opening at a mold filling position, means for guiding molds successively past said opening whereby to fill them with the plastic material, means for yieldingly supporting said guiding means, and means for adjusting said guiding means with reference to their support.

16. In a mold filling machine, a pair of pressure rolls cooperating to force plastic vulcanizable material between them, a gum pot contacting with said rolls at the delivery side thereof and providing a pressure chamber with an outlet opening, yielding means for supporting said gum pot, means for guiding molds successively past the outlet opening but maintaining the molds in surface contact with the delivery face of the gum pot, and means for adjusting said guiding means toward and from the plane of said opening.

17. In a mold filling machine, a pair of pressure rolls cooperating to force plastic vulcanizable material between them, a gum pot contacting with said rolls at the delivery side thereof and providing a pressure chamber with an outlet opening, yielding means including a pressure cylinder for supporting said gum pot, anti-friction rollers carried by said supporting means for guiding molds successively past the outlet opening, and means for adjusting said guide rollers with reference to the supporting means.

18. In a mold filling machine, a pair of forcing rolls for passing plastic vulcanizable material between them, a member contacting with both rolls at the delivery side thereof and providing a pressure chamber for receiving the material from the rolls, said pressure chamber having an outlet opening at a mold filling position, means for yieldingly supporting said member against the rolls, means for successively feeding molds past the filling position, and means including a pressure cylinder for permitting withdrawal of one of the rolls from contact with the pressure chamber member to suspend the material feed or to relieve excess pressure.

19. In a mold filling machine, a pair of forcing rolls for passing plastic vulcanizable material between them, a member contacting with both rolls at the delivery side thereof and providing a pressure chamber for receiving the material from the rolls, said pressure chamber having a narrow outlet slot at a mold filling position, means including a pressure cylinder for retractably supporting said member against the rolls, pressure actuated means for intermittently feeding molds past said outlet slot, and means including a pressure cylinder for permitting withdrawal of one of the rolls from contact with the pressure chamber member to suspend the material feed during the periods of inaction of the mold feeding means, said pressure cylinder being controlled by the mold feeding means.

20. In a mold filling machine, the combination of a pair of pressure rolls cooperating to force plastic vulcanizable material between them, means contacting with the rolls and providing a pressure chamber extending throughout the length of the rolls for receiving the material therefrom, said pressure chamber being formed with a die opening extending throughout the length thereof whereby the material will be forced through the die opening under a substantially uniform pressure throughout the length thereof, means for guiding multi-cavitied molds successively past the die opening whereby the material issuing from the die opening will be caused to fill the mold cavities under the pressure created by the rolls in the pressure chamber, and means for maintaining the molds in contact with the die opening as they are carried past the same.

In witness whereof I have hereunto set my hand this 24th day of July, 1928.

JOHN R. GAMMETER.